US006203773B1

(12) United States Patent
Easley et al.

(10) Patent No.: US 6,203,773 B1
(45) Date of Patent: Mar. 20, 2001

(54) LOW TEMPERATURE MINERALIZATION OF ALUMINA

(75) Inventors: Michael A. Easley, Arnold; Alan Pearson, Murrysville, both of PA (US); Dinesh Moorjani, Little Rock; John E. Marhanka, Benton, both of AR (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/351,968

(22) Filed: Jul. 12, 1999

(51) Int. Cl.$^7$ ........................................................ C01F 7/02
(52) U.S. Cl. ................................................................ 423/626
(58) Field of Search ..................... 423/625, 628, 423/626

(56) References Cited

U.S. PATENT DOCUMENTS

| | | | |
|---|---|---|---|
| 3,175,883 | * 3/1965 | Lindsay et al. | 423/625 |
| 3,655,339 | 4/1972 | MacZura et al. | 23/142 |
| 3,950,507 | 4/1976 | Kuklina et al. | 423/626 |
| 4,379,134 | 4/1983 | Weber et al. | 423/626 |
| 4,390,508 | 6/1983 | Watanabe et al. | 423/112 |
| 5,069,938 | 12/1991 | Lorimer et al. | 427/255.1 |
| 5,296,085 | 3/1994 | Faure et al. | 156/603 |
| 5,340,781 | 8/1994 | Oda et al. | 501/127 |

FOREIGN PATENT DOCUMENTS

| | | | | |
|---|---|---|---|---|
| 644277 | * 3/1995 | (EP) | ...................................... | 423/625 |
| 5270818 | 10/1993 | (JP) . | | |

* cited by examiner

*Primary Examiner*—Steven Bos
(74) *Attorney, Agent, or Firm*—Glenn E. Klepac

(57) ABSTRACT

Alpha alumina particles are made by heating particles of alumina with an aqueous solution containing a dissolved fluorine-containing compound and an acid; separating the particles from the solution and then calcining the particles at a temperature not greater than about 1025° C. The alumina particles preferably have an LOI in the range of about 1–20 wt. %; more preferably about 1–6 wt. %. Alpha alumina particles of the invention are more readily ground into smaller particles than alpha alumina particles made by calcining at higher temperatures.

The remaining soda in the alpha alumina is found to be highly soluble in hot water. The process produces low soda content (0.01 wt. % $Na_2O$ or less) alpha alumina crystals from alumina feedstocks with 0.5 wt. % or more initial soda levels. The alpha alumina crystals produced are as large as 30–40 microns. Most typically; the size range is between 2 and 8 microns. Because of the low mineralization temperature, the particles require significantly less grinding time to separate the component alpha crystals.

16 Claims, No Drawings

LOW TEMPERATURE MINERALIZATION OF ALUMINA

FIELD OF THE INVENTION

The present invention relates to an improved process for mineralization of alumina. The term "mineralization" refers to the conversion of alumina to alpha alumina by heating at elevated temperatures in the presence of a mineralizer. The mineralized product is useful as a ceramic or refractory material.

BACKGROUND OF THE INVENTION

Processes for making alpha alumina are known in the prior art. Alpha alumina is usually prepared by calcining aluminum hydroxides or transition phase aluminas or other inorganic or organic compounds of aluminum at a maximum temperature of 1200° C. or more. At approximately 1000° C. a slow transformation starts, accelerating with increasing temperature. The temperature and time of calcination are selected to obtain complete conversion to alpha alumina and to eliminate transition forms of alumina. The calcined powder is then often milled to a fine particle size, generally less than about 10 microns. Sintered ceramic articles can then be made by pressing or slip casting the ground alpha alumina powder to a desired shape and then firing the "green" shape to a temperature in the range of about 1400°–1800° C. to obtain the final product.

Kuklina U.S. Pat. No. 3,950,507 and Weber U.S. Pat. No. 4,379,134 are prior art patents disclosing processes for making alpha alumina particles. The products have good purity. However, the processes disclosed in these patents include calcination temperatures of about 1200° C. or more. Consequently, reduction of the resulting products to particles having an average size of less than about 10 microns requires considerable time and energy.

The exact mechanism of mineralization is not clear, but somehow a mineralizer acts to facilitate transfer of material from high energy to low energy sites. Crystal growth during calcination is affected by temperature, type, and amount of mineralizer present (probably on the alumina surface) and condition (amount of alpha present) of the alumina at the time the mineralization reaction is initiated. If the alumina has been pre-calcined to pure alpha phase, limited growth (during subsequent nineralization) occurs, probably by a process analogous to ripening in precipitation where a material from smaller crystals migrates to larger crystals to mninimize excess surface area. In the usual industrial case, alumina is heated rather slowly in a rotary kiln and some conversion to alpha has already occurred (beginning about 1000° C.) before the mineralization reaction is initiated (at about 1200° C. with aluminum fluoride). It is believed that the mineralization with aluminum fluoride is dependent on the hydioylsis of aluminum fluoride which does not occur in any appreciable amount until about 1150° C. At this point, transition alumina (high surface, unstable structure) is rapidly depleted as material is transported to alpha alumina crystal sites causing rapid crystal growth. The reaction is autocatalytic because loss of surface energy results in a significant rapid increase in temperature and desorption of fluoride which increases vapor phase fluoride content in the immediate vicinity of the reaction. Both of these effects accelerate the reaction. The resulting alpha alumina crystal size is mostly affected by the number of alpha sites present at the initiation of mineralization (few sites resulting in large crystals, many sites resulting in small crystals). If the mineralization temperature is kept low, fewer alpha sites are produced from the natural unmineralized reaction and larger crystals can be produced. Once the alpha transformation is completed, further crystal growth Occurs by the much slower ripening mechanism described above. The role of soda in calcination of alumina deserves special attention because it is nearly always present in commercial aluminas. It is commonly known that increasing soda content retards alpha alumina transformation in normal calcinations without mineralizers. Fluoride has been shown to mineralize crystal growth in alumina with very little soda present but fluoride in the presence of soda results in larger crystals. This strongly implies that sodium does play a key role in the mineralization process. If sodium fluoride is present (generally greater than 1 wt. %) beta alumina can form which tends to have very large, plate-like crystals with high aspect ratios.

For mineralization to be effective, it is necessary to have a high enough temperature to initiate the reaction and enough mineralizer present to facilitate transport. These two conditions can work against each other if the mineralizer has a high degree of volatility. For crystal growth to be controllable, the alumina must be in the proper state of preconditioning when the mineralization reaction is initiated. Our invention allows the reaction to occur at 950°–1025° C. because we are able to bring sufficient amounts of necessary mineralization components (sodium, alumina and fluoride) intimately together. This can be accomplished by wet loading the fluoride onto the alumina before calcination or bringing fluoride containing vapor into intimate contact with the other two components at approximately 1000° C. The process uses the inherent soda in the alumina and adds no alkali to the process. Our liquid load technique actually substantially reduces the alkali content of the alumina at ambient temperature (before mineralization).

It is known from MacZura et al U.S. Pat. No. 3,655,339 that the relative proportions of soluble and insoluble soda in calcined alumina are dependent upon total soda content. Using well washed hydrate feedstocks with varying soda contents, the patentees found that 92.7% of all soda could be leached from calcined alumina containing 0.16 wt. % soda, while only 36.4% of all soda was leached from calcined alumina containing 0.55 wt. % soda. There was a steady decline in percentage reduction of soda content in 8 test samples as the initial total soda content increased.

Normally in fluoride mineralized aluminas the proportion of soluble soda is lower after calcination, possibly because the soda is tied up with beta alumina.

The liquid load/leach process of the present invention, followed by low temperature calcination, enables removal of 88–98% of total soda content from the alumina. Soda content is reduced by 78% with the fluoroform calcination process of the present invention.

A principal objective of the present invention is to provide an efficient and economical process for making alpha alumina particles at reduced temperatures.

A further objective of our invention is to provide a process for making alpha alumina particles having reduced sodium content.

A related objective of the invention is to provide a process for making alpha alumina particles of reduced particle size wherein less time and energy are required for grinding than in the prior art.

Additional objectives and advantages of our invention will become apparent to persons skilled in the alt from the following detailed description of a preferred embodiment.

SUMMARY OF THE INVENTION

In accordance with the present invention, alumina particles are treated with an aqueous solution containing a dissolved fluorine-containing compound. Alumina in various rehydchation states can be employed including the normal transitional chi, kappa, gamma, delta, theta, eta, as well as mono hydrated varieties such as boehmite and psuedoboehmite as well as mixed states such as electrostatic precipitator (ESP) dust mixtures. Gibbsite (aluminum trihydrate obtained from the well known "Bayer" process) can be utilized after a mild thermal treatment to increase its surface area. As used herein, the term "alumnina hydrate" refers to $Al_2O_3 \cdot xH_2O$, wherein x varies from about 0.2 to 3. In other words, the water content varies between about 3 and 35 percent by weight of the alumina hydrate, determined by calcination at 1200° C. for one hour. Alumina hydrate that is suitable for use in our process can be obtained from a variety of sources, most commonly as a product of the well-known "Bayer" process.

The alumina particles preferably have a water content less than 15 wt. % (LOI as determined by the loss of weight of the starting alumina after calcination to 1200° C. for one hour) immediately before introduction to the loading solution.

The alumina particles may have an LOI of less than about 20 wt. % and preferably about 1–20 wt. %, more preferably about 2–12 wt. %, and optimally about 6–10 wt. %. Trihydrated forms of alumina can be used after a mild heat treatment. A wide variety of particle sizes can be used for the process. Suitable average particle sizes (d50) include 0.1–125 microns.

The ambient temperature alumina particles are mixed in a aqueous solution containing a dissolved fluorine-containing compound and acid. The acid not only leaches much of the sodium from the alumina but also acts to adjust the pH of the adsorbing solution to facilitate fluoride pickup.

The fluorine-containing compound may be any water-soluble fluoride of a metal or ammonium and is preferably $KF$, $NaF$, $NH_4F$, $UNH_4F_2$ or a mixture thereof The fluoride first replaces surface hydroxyls and later begins to form bridges between aluminum atoms as monolayer coverage is approached.

The aqueous alunina/fluoride/acid loading solution preferably has a pH range between 4.5 and 7. The acid in solution helps to maintain this pH level. The acid leaches much of the sodium from the alumina while the alumina picks up much of the fluoride from solution. Fluoride pickup was found to be greatest between pH 5 and 6.5. Lower pH (below 4.5) resulted in increased solubilization of the alumina into solution. Higher pH (greater than 8) left much of the fluoride in solution. The solution is separated from the alumina by filtration or any other means that isolates much of the residual acid components, water, and dissolved sodium compounds from the fluoride loaded alumina. No further washing of the slurry is necessary although it can be further washed with clean water to slightly reduce the amount of sodium on the loaded alumina. The order of addition of components can be changed to facilitate production. For instance, an aqueous fluoride solution can be added to a mixing, alumina slurry. The mixture can then be titrated with acid to a pH of less than 6.5 to remove soda and to optimize the fluoride pickup.

The fluoride-treated low sodium content alumina slurry can then be dried to facilitate handling or fed directly into the calciner. The calcination takes place at a temperature range of about 950°–1025° C. for a sufficient time to convert at least most of the alumina to alpha alumina. A calcination temperature of about 975°–1025° C. for about one-half hour to two hours is preferred. More preferably, the particles are calcined at about 1000° C. for at least one-half hour. The particles can be calcined in static beds in furnaces, kilns or gas-fired converters or in semi-static beds such as rotary kilns. The particles can also be introduced into hot fluid beds or any other suitable hot environment.

The calcined alpha alumina particles are cooled and then easily comminuted by grinding to a desired particle size. In a preferred embodiment, the ground particles are less than 10 microns in average size, more preferably less than about 7 microns and optimally less than about 5 microns. Some particularly preferred alpha alumina particles have an average size in the range of about 1–4 microns.

In an alternative embodiment of our invention, gaseous or liquid fluoride species are introduced directly to the alumina at 950°–1025° C. The fluoride species are fluorine compounds having a boiling point of less than about 300° C. Fluorinated hydrocarbons are preferred. A very safe means to accomplish this objective is to introduce a fluorinated hydrocarbon compound such as fluroform. The fluroform decomposes at the elevated temperature. The gaseous fluorides species intimately permeate the alumina and allow the mineralization to occur. There is a well defined HF adsorption peak at 1000° C. (on alumina containing 0.14% NaO with a surface area of 10 $M^2/g$) with maximum adsorption of about 0.06% fluoride for HF concentrations in the gas phase over 1000 ppm. Since 10 $M^2/g$ alumina would be mostly alpha phase, this indicates that alpha alumina has significant capacity to adsorb fluoride near calcination temperatures. For the present invention, mineralization takes place when the alumina reacts with the fluoride at approximately 1000° C. The cooled alpha alumina particles can then easily be comminuted by grinding to a desired particle size. This technique is not as advantageous as the liquid load/leach technique presented earlier because the sodium content is not reduced beforehand. The technique is not as efficient from a fluoride usage prospective because some of the fluoride escapes before making contact with alumina particles.

DETAILED DESCRIPTION OF A PREFERRED EMBODIMENT

The preferred fluoride source for this low temperature process is ammonium bifluoride. This material is an economical source of fluoride, dissolves and dissociates easily in aqueous solutions and contains no alkaline cations that can be readsorbed during, the loading, process. The compound is much easier and safer to handle than hydrofluoric acid. Ammonium bifluoride is particularly preferred over sodium fluoride and potassium fluoride because alkaline cations such as potassium or sodium can be adsorbed back onto the alumina to balance the highly negative fluoride surface charge. Any adsorbed cationic ammonia can be removed easily with subsequent mild vacuum or elevated temperature treatment to produce higher purity aluminas. The preferred acid used to adjust the pH and help remove sodium is dilute acetic acid. Acetic acid contains no competing anions that may be adsorbed, is economical, and is safer and more compatible with manufacturing equipment than other acids such as nitric or sulfuric. White vinegar (5% guaranteed strength acetic acid) is an ideal source of dilute acetic acid. Any residual carbon compounds left from the leach/load step can easily be burned off from the alumina during the calcination. If sulfuric acid is used, residual sulfur species may be difficult to remove from the alumina. If nitric acid is used, residual toxic nitrogen compounds may be volatilized during calcination. Hydrochloric acid has the disadvantage that chloride anions start to be adsorbed onto the surface below pH 6.5, thereby competing with fluoride adsorption. Hydrofluoric acid used by itself does not efficiently remove soda from the alumina.

Other fluoride sources that can be substituted in whole or in part for ammonium bifluoride are KF, NaF, $NH_4F$ and HF. Preferably the fluoride source is added to the dilute acid solution followed by the addition of the alumina. The pH of the aqueous acid/fluoride mixture rises very quickly as the fluoride is adsorbed from solution and much of the sodium is removed from the alumina. These chemical reactions are usually accomplished in about one minute. The procedure can be performed using ambient temperature water or with hot water. The use of hot water will lower the soda content of the alumina. A generous mixing time of 30 or more minutes is preferred to assure maximum fluoride pickup. The components can be mixed in different orders with equivalent results. Increasing the temperature of the aqueous solution has little effect on fluoride pickup by the alumina when sufficient time, on the order of 5–30 minutes, is allowed for the fluoride to adsorb. Increasing the water temperature increases the sodium removal efficiency as the sodium compounds have greater solubility in warm aqueous solutions.

The alumina particles are separated from the solution by normal techniques such as filtering or centrifuging. The separated slurry can be further leached with clean water to further reduce soda and residual acid content, or the slurry could be introduced directly into a fluid bed or rotary kiln. The alumina is heated and exposed to a temperature between 950° C. and 1025° C. for 1–120 minutes. Ideally, an exposure time of 30–60 minutes at 1000° C. is used. Sometimes a significant exotherm can be measured during the mineralization reaction especially in a fluid bed.

The process produces 0.5–35 micron average crystal size alpha alumina (corundum) crystals. Most often the crystal size range is between 1 and 10 microns. The size range appears to be related to characteristics of the feedstock. Seeding the feedstock with 1–15% alpha alumina often reduces the size of the alpha crystals. The cooled mineralized sample can be ground much easier than conventionally produced samples at higher temperatures.

The cooled sample produced with the liquid load/leach technique can be leached to a higher purity by simply treating the sample with hot deionized water. The hot aqueous treatment removes much of the remaining soda and fluoride from the mineralized sample. Retention of the fluoride on the mineralized sample can be facilitated by increasing the alumina bed depth during mineralization. The amount of fluoride needed to catalyze the mineralization is inversely proportional to bed depth.

The fluoride in the hot leach water can be recycled onto fresh alumina by adjusting the pH with fresh acid and adding fresh alumina. The sample treated with the recycled fluoride can then be mineralized at 950°–1025° C.

EXAMPLE 1

A 10.5722 grams sample of ammonium bifluoride was added to a solution composed of 100 grams of acetic acid and 7900 grams of deionized water and allowed to dissolve. 4000 grams of a smelting grade alumina (SGA) were added to the solution. The SGA had the following characteristics: Surface area=71 $M^2/g$; $Na_2O$=0.33 wt. %; density=3.43 $g/cm^3$; fluoride=0.0006 wt. %; D (50) average particle size=85 microns; LOI (1200° C.)=2.5 wt. %; $SiO_2$=0.006 wt. %; CaO=0.008 wt. %; and total organic=0.02 wt. %. The SGA was stirred in the solution for 30 minutes. The pH of the solution rose from 2.8 to 5.5 with the alumina addition. The solution was filtered using a Buchner funnel fitted with #40 Whatman paper. The pH of the filtrate was 6.3. No wash was used on the cake. The leach/loaded alumina was dried at 109° C. The treated alumina had a soda content of 0.14 wt. % and a fluoride content of 0.17 wt. % indicating near 100% pickup of the fluoride. The dried fluoride loaded alumina contained less than 0.01 wt. % $NH_3$ and had an organic content of 0.43 wt. %. Analyses of the slurry and filtrate indicate that virtually all of the $NH_3$ remained in the filtrate or was removed during the vacuum filtration. The treated particles (3900 grams) were mineralized by heating in 99.8 wt. % alumina crucibles at 1000° C. for 60 minutes. The cooled samples were analyzed to be 99+% alpha alumina with a surface area of 0.45 $M^2$/gram. The cooled samples had a soda content of 0.08 wt. %, fluoride content of 0.09 wt. %, less than 0.01 wt. % $NH_3$ and organics. The cooled samples were ground down to an average particle size of less than 5 microns. We found that alpha alumina particles made in accordance with our invention could be ground into smaller particles in substantially less time than prior art alpha alumina particles having a similar crystal size. Cooled mineralized samples were also washed with hot water. The washed samples were found to contain 0.01 wt. % Na2O and 0.05 wt. % F. This indicates 97% soda solubility from starting feedstock to finished product. Table I summarizes the chemical data. The commercially produced A-12 comparison sample had a mineralized soda value of 0.17 wt. %. After leaching the soda value was 0.16 wt. %.

EXAMPLE 2

The starting material is a Bayer process alumina trihydrate (ATH) manufactured by Alcoa Industrial Chemicals and sold as C-30 alumina. The ATH has a density of about 2.42 $g/cm^3$ and contains about 34.8 wt. % water of hydration. Average particle size d (50) is about 110 microns. Some other typical properties are as follows:

TABLE 1

Soda and Fluoride Analyses

| Example | Feedstock | Feedstock $Na_2O$ (wt. %) | Pre mineralization $Na_2O$ (wt. %) | Post mineralization $Na_2O$ (wt. %) | Post Wash $Na_2O$ (wt. %) | Pre mineralization Fluoride (wt. %) | Post mineralization Fluoride (wt. %) | Post Wash Fluoride (wt. %) |
|---|---|---|---|---|---|---|---|---|
| 1 | SGA | 0.33 | 0.14 | 0.08 | 0.01 | 0.17 | 0.09 | 0.05 |
| 2 | C-30 | 0.40 | 0.11 | 0.092 | 0.012 | 0.39 | 0.13 | 0.05 |
| 3 | IS-75 (SGA) | 0.35 | 0.14 | 0.14 | 0.016 | 0.66 | 0.43 | 0.09 |
| 4 | A-50 (ESP dust) | 0.75 | 0.33 | 0.33 | 0.054 | 0.31 | 0.21 | 0.07 |
| 5 | Lab ppt. #1 | 1.76 | 0.76 | 0.70 | 0.027 | 0.62 | 0.40 | 0.06 |

TABLE 1-continued

Soda and Fluoride Analyses

| Example | Feedstock | Feedstock Na$_2$O (wt. %) | Pre mineralization Na$_2$O (wt. %) | Post mineralization Na$_2$O (wt. %) | Post Wash Na$_2$O (wt. %) | Pre mineralization Fluoride (wt. %) | Post mineralization Fluoride (wt. %) | Post Wash Fluoride (wt. %) |
|---|---|---|---|---|---|---|---|---|
| 8 | SGA (Brazil) | 0.50 | 0.15 | 0.14 | 0.11 | 0.30 | 0.04 | 0.03 |
| 9 | C-31 | 0.121 | 0.042 | 0.027 | 0.015 | 0.33 | 0.07 | 0.038 |
| 10 | C-30 (950° C.) | 0.40 | 0.15 | 0.11 | 0.032 | 0.41 | 0.003 | 0.01 |
| 12 | Lab ppt.#2 | 0.45 | 0.09 | .006 | .002 | 0.62 | 0.02 | 0.01 |
| 13 | CP-100 | 0.35 | 0.14 | 0.14 | 0.014 | 0.35 | 0.22 | 0.05 |

TABLE 2

Chemical Analysis, %

| | |
|---|---|
| Al$_2$O$_3$ | 64.8 (64.5 min.) |
| SiO$_2$ | 0.15 |
| Fe$_2$O$_3$ | 0.01 |
| Na$_2$O (total) | 0.40 |
| Na$_2$O (soluble) | 0.03 |
| LOI (110°–1200° C.) | 34.8 |
| Moisture (110° C.) | 0.05 (0.10 max.) |

Physical Analysis

| | |
|---|---|
| Bulk density, loose, g/cm$^3$ | 1.1–1.3 |
| Bulk density, packed, g/cm$^3$ | 1.5–1.7 |
| Specific Gravity | 2.42 |
| Surface Area, M$^2$/g | 0.1 |
| Moh's hardness | 2.5–3.5 |
| Reactive Index | 1.57 |
| Brightness, %† | 75 |
| Color | Off-white |

Particle Size Analysis (cumulative)‡

| | |
|---|---|
| % on 100 mesh | 0–20 |
| % on 200 mesh | 60–90 |
| % on 325 mesh | 92–99 (88 min.) |

†GE Photovolt measurement
‡Tyler Standard Screen Sizes

The ATH was activated at 450° C. to reduce the LOI to less than 5% and increase the surface area to 250 M$^2$/g.

650 grams of the cooled activated alumina particles were placed in a dilute aqueous solution containing 7.02 grams of potassium fluoride, 3559 grams of deionized water and 16.25 grams of acetic acid, and stirred at room temperature for 30 minutes. The pH of this solution was about 3.0–3.5 before alumina addition. The pH rose to about 6.0–6.5 after the alumina was added. The solution was filtered, and the filtrate was analyzed by ICP for dissolved alumina. The filtrate contained less than 1.3 mg/L alumina, indicating that virtually no alumina was being dissolved. The filter cake was not washed.

The wet filter cake was dried in a 110° C. drying oven. The treated alumina was found by XRD to contain a mixture of boehmite and kappa-prime transition alumina. The LOI was about 10 wt. %. The soda content of the treated alumina was 0.11 wt. % and the fluoride content was found to be 0.39 wt. % indicating approximate total pickup of the fluoride from solution. Potassium content of the loaded sample was found to be less than 0.01 wt. %.

The leach/loaded particles were mineralized by heating in 99.8 wt. % alumina crucibles at 1000° C. for 60 minutes. The cooled samples were analyzed to be 99+% alpha alumina with a surface area of 0.52 M$^2$/gram. The samples were then cooled and ground down to an average particle size of less than 5 microns. A sample of the unground mineralized alumina was treated with hot water and filtered. The soda level was decreased from 0.092 wt. % to 0.012 wt. %. This is a 97% reduction in soda from the starting feedstock level. The fluoride level was decreased from 0.13 wt. % to 0.05 wt. %. Results are shown in Table 1.

A sample of the mineralized sample was put back into a 99.8 wt. % alumina crucible and recalcined at 1000° C. Soda level in the recalcined sample remained constant at 0.09 wt. % while the fluoride level was reduced to 0.02 wt. %. Table 3 includes the vapor pressures of various fluoride compounds at 1000° C. The recalcination data suggests that the fluoride most likely escaped by atmolite-like compound route.

TABLE 3

Vapor Pressures of various Compounds

| Name | Formula | Vapor Pressure (mm Hg) | Approximate Temperature (° C.) |
|---|---|---|---|
| Sodium fluoride | NaF | 0.2 | 1000 |
| Sodium fluoride | NaF | 0.5 | 1027 |
| Cryolite | Na$_3$AlF$_6$ | 1.6 | 1000 |
| Aluminum fluoride | AlF$_3$ | 11 | 1000 |
| Atmolite | NaAlF$_4$ | 78 | 1000 |

Ref: M. Ushio, "Crystal Growth of Thin-Plate beta-Alumina by Liquid Transport", J. Materials Science 30 (1995), pp. 2981–2988.

EXAMPLE 3

16.25 grams of acetic acid were mixed with 3558.75 grams of deionized water. 13.4991 grams of potassium fluoride were added and dissolved. 650.0 grams of IS-75 smelting grade alumina (SGA) were added. IS-75 alumina is produced by Alcoa and has the following characteristics: Surface area=75 M$^2$/gram; Na$_2$O=0.34 wt. %; SiO$_2$=0.07 wt. %; CaO=0.029 wt. %; D50=108 micron; D90=173 microns; D10=73.4 microns. The mixture was filtered after 30 minutes using #40 Whatman paper. No wash was used. The filter cake was dried at 109° C. overnight. Fluoride analysis of the solution and dried filter cake indicated that the alumina had 0.66 wt. % fluoride which indicates 97.1% pickup of the fluoride. The soda level of the loaded alumina was reduced to 0.14 wt. %. The leach/loaded particles were mineralized by heating in 99.8 wt. % alumina crucibles at 1000° C. for 60 minutes. The cooled samples were analyzed to be 99+% alpha alumina with a surface area of 0.54 M$^2$/gram. The samples were then cooled and ground down to an average particle size of less than 5 microns. A sample of the unground mineralized alumina was treated with hot water and filtered. The soda level was decreased from 0.14% to 0.016%. This is a 95.3% reduction in soda from the starting feedstock, level. The fluoride level was decreased from 0.13 wt. % to 0.05 wt. %. Results are tabulated in Table 1.

EXAMPLE 4

650.0 grams of electrostatic precipitator (ESP) dust from a Alcoa smelting grade alumina production line were loaded with 0.31 wt. % fluoride in a similar way to that described in Examples 2 and 3. The ESP dust is a mixed phase alumina consisting of mainly of transitional phases of chi and kappa but with some alpha and residual gibbsite. Small amounts of alpha (seed) tend to minimize the ultimate crystal size. The LOI of the ESP dust is about 10 wt. % and the average particle size D50 is 11 microns with the D90 being 19 microns. The initial soda content was measured to be 0.75 wt. %. The loaded slurry was filtered using #42 Whatman paper. No wash was used. The filter cake was dried at 109 C overnight. The soda level of the loaded alumina was reduced to 0.33 wt. %. The leach/loaded particles were mineralized by heating in 99.8 wt. % alumina crucibles at 1000° C. for 60 minutes. The cooled samples were analyzed to be 99+% alpha alumina. The soda level of the mineralized alumina was found to be 0.31 wt. % and the fluoride level was found to be 0.21 wt. %. SEM analyses of the mineralized sample indicated that the alpha crystal range averaged 0.5–3.5 microns. The mineralized sample was leached with hot water. The leached sample contained 0.054 wt. % soda and 0.07 wt. % fluoride. This indicates that about 93% of the initial soda was removed from the feedstock.

EXAMPLE 5

This example will show the leachabilty of the soda and the ability to produce very large alpha crystals (composition of matter) with low soda levels. Gibbsite was precipitated using a special procedure to elevate the soda level (Lab Precipitated #1 in Table 1). XPD analysis of the alumina indicated all gibbsite phase. The alumina had an soda level of 1.76 wt. % and a fluoride level less than 0.01 wt. %. 25.0 grams of this gibbsite were activated to 450° C. and cooled in a dessicator (activated weight=16.6 grams). White vinegar (analyzed to be 5.00 wt. % acetic acid strength) was mixed with 66.4 grams of de-ionized water and then 0.3147 grams of potassium fluoride were added and dissolved. Then 16.6 grams of activated alumina were added and the mixture was stirred for 30 minutes. The mixture was filtered with Buchner funnel and vacuum with #42 Whatman Paper. The filter cake was not washed. The filter cake was dried overnight in a 109° C. oven. The leach/loaded alumina had a soda content of 0.76 wt. %, a fluoride level of 0.62, a silica content of 0.000 wt. % and a calcia content of 0.005 wt. %. 14.4 grams of the leach/loaded alumina was mineralized for 60 minutes at 1000° C. The cooled alumina was found to be all alpha alumina with a surface area of 0.23 $M^2$/gram, a soda content of 0.70 wt. % and a fluoride content of 0.40 wt. %. Microscopic analyses indicated that the size range of the alpha crystals was 6–30 microns with most of the crystals averaging 12–30 microns. A sample of the mineralized sample was leached with hot water and dried. The soda level of the leached sample indicated that the very large crystals were quite pure with a soda level of 0.027 wt. % and fluoride level of 0.06 wt. %. This demonstrated a 98.5% reduction in soda level from the initial gibbsite.

EXAMPLE 6

This example demonstrates that much of the residual fluoride can be recycled. A large batch of mineralized alumina was made with SGA similar to that described in Example 1. The mineralized alumina was cooled and treated with hot deionized water (containing less than 0.1 ppm F) to reduce the fluoride and soda levels. The sample was vacuum filtered with a Buchner filter and #40 Whatman paper. The filtrate contained 41.8 mg/liter fluoride. The filtrate was further concentrated by evaporating the solution at 80° C. on a hot plate. The concentrated solution contained 346.7 mg/L fluoride. Both the filtrate and the concentrated filtrate had neutral pHs. 80 grams of the cooled concentrated filtrate were mixed with 20 grams of white vinegar (analyzed to be 5.0 wt. % acetic acid). 20.0 grams of alumina were added and stirred at room temperature for 30 minutes. The alumina was activated C-30 gibbsite (Alcoa) surface area=250 $M^2$/gram (same material as that used in Example 2). The mixture was vacuum filtered with a Buchner funnel using #42 Whatman paper. The leach/loaded alumina had a fluoride content of 0.15 wt. % and a soda level of 0.11 wt. %. The alumina was mineralized in a deep bed in a 99.8 wt. % alumina crucible for 60 minutes at 1000° C. The cooled alumina was found to be virtually all alpha with a alpha crystal range of 1–12 microns. The fluoride content decreased slightly to 0.14 wt. % while the soda content remained constant.

EXAMPLE 7

This example shows the influence of a deliberate addition of alpha seed on the mineralized crystal size. A gibbsitic mixture was made by precipitating gibbsite onto alpha alumina seed in a concentrated sodium aluminate solution. The alpha seed used was Alcoa milled A-152 (1.42 micron average). The dried sample was 11 wt. % alpha by weight and 89 wt. % gibbsite. The mixture was activated to remove water and increase surface area to 225 $M^2$/gram. The mixture had a soda content of 0.28 wt. %. The cooled activated alumina was leach/loaded in a way similar to previous examples. The leach/loaded alumina had a soda content of 0.09 wt. % and a fluoride content of 0.45 wt. %. The sample was mineralized in a 99.8 wt. % alumina crucible for 60 minutes at 1000° C. The cooled sample was found to be 99 wt. % alpha alumina. The average crystal size range was determined to be 0.5–3.0 microns.

EXAMPLE 8

Another suitable starting alumina is a smelting grade alumina (SGA) produced by Alcoa in Brazil. The starting material has the following characteristics: Size-d (v,0.5)= 110 microns; +150 microns (wt. %)=19.5; +44 microns (wt. %)=93.7; <20 microns (wt. %)=1.2. Chemical composition: $Na_2O$=0.5 wt. %; CaO=0.033 wt. %; $SiO_2$=0.022 wt. %; $Fe_2O_3$=0.029 wt. %; Surface Area=73 $M^2$/g; LOI=1.0 wt. %; Attrition Index=22 wt. %. 30 grams of acetic acid were added to 2370 grams of deionized water. 5.40 grams of ammonium bifluoride were added to the solution and allowed to dissolve. 1800 grams of SGA was added and stirred for 30 minutes. The pH of the solution rose from 2.8 to 5.5 with the alumina addition. The solution was filtered using a Buchner funnel fitted with #40 Whatman paper. The pH of the filtrate was 6.3. No wash was used on the cake. The filter cake was dried in an evaporating dish at 109° C. The fluoride analysis of the loaded alumina was determined to be 0.30 wt. %. The $Na_2O$ level of the loaded alumina was determined to be 0.15 wt. %. The leach/loaded alumina was introduced into a fluidized bed that was fluidized with 91.5 wt. % steam and 8.5 wt. % air. Fluidization velocity was 0.0865 n/sec. The differential pressure of the fluid bed was measured to be 0.872 KP. The sample was allowed at fluidize for 60 minutes once the bed returned to the normal starting temperature of 1000° C.

When the sample was cooled to room temperature the surface area of the alpha alumina was measured and found to be 0.44 M²/g with a soda content of 0.14 wt. %. The alumina had a fluoride content of 0.04 wt. %. The cooled mineralized sample was leached with hot water and the soda was reduced to 0.11 wt. % (a reduction of 88% from the starting gibbsite) and the fluoride to 0.03 wt. %.

Further experiments were performed with the untreated fresh SGA feedstock to study fluoride adsorption and soda removal with changing the temperature of the leach/load water. The above feedstock was leach/loaded using 23, 50, and 80° C. condensate water from the Brazil manufacturing location. The leach/load contact time was reduced to one minute to study the effect of time. The 23° C. sample picked up 93.5% of the fluoride, the 50° C. sample picked up 96.4% and the 80° C. sample picked up 98.7% of the fluoride with one minute contact time. The soda level of the 23° C. sample was 0.17 wt. %. The soda level of the 50° C. was 0.15 wt. % and the soda level of the 80° C. sample was 0.11 wt. % (showing that a slight increase in initial adsorption) can be attained by increasing the temperature of the load/leach solution. These temperatures demonstrate how quickly the actual load/leach chemistry really works.

EXAMPLE 9

This example shows how an alumina hydrate with low soda and high brightness can mineralize at low temperatures. The gibbsite (Alcoa C-31) had a initial soda level of 0.12 wt. % and a initial fluoride level of 0.012 wt. %. The gibbsite was activated to increase the surface area to 250 M²/gram and remove much of the water. 650.0 grams of the activated alumina were added to a solution made up of 2925 grams of deionized water, 325 grams of white vinegar and 7.0150 grams of potassium fluoride. The mixture was stirred for 30 minutes and then vacuum filtered through #40 Whatman paper. No wash was used on the filter cake. The filter cake was dried at 109 C overnight. The dried leach/loaded filter cake had a soda content of 0.042 wt. % and a fluoride content of 0.33 wt. % indicating 94% pickup of fluoride from solution. 620 grams of the leach loaded alumina was mineralized at 1000° C. for 60 minutes. The mineralized sample was found to be 99+% alpha. The mineralized sample had a soda level of 0.027 wt. % and a fluoride level of 0.07 wt. %. The cooled mineralized sample was leached with hot water and dried. The leached sample had a soda level of 0.015 wt. % and a fluoride level of 0.038 wt. %. This is a 91.7% reduction in soda level from the starting alumina.

EXAMPLE 10

This example shows that the base material behaves the same way with a near mineralization pretreatment. C-30 gibbsite (same as used in Example 2) was calcined in a bed to 950° C. The surface area of the calcined alumina was 50 M²/gram and the LOI was determined to be 2.0 wt. %. The cooled alumina was leach loaded similar to Example 2. The leach/loaded alumina had a $Na_2O$ level of 0.15 wt. % and a fluoride level of 0.41 wt. %. The leach/loaded sample was mineralized for 60 minutes, as in Example 2, at 1000° C. The mineralized sample was found to be 99+% alpha with a soda content of 0.11 wt. % and a fluoride content of 0.03 wt. %. The mineralized sample was leached with hot water and dried. The hot washed sample had a soda content of 0.032 wt. % and a fluoride content of 0.01 wt. %. This represents a 92% reduction in soda from the initial starting alumina.

EXAMPLE 11

This example demonstrates the fluoride capacity that the alumina has at 1000° C. This example demonstrates that a mineralized sample can be produced at about 1000° C. if the fluoride is made available at an early enough temperature. The mineralized alumina grinds easier than conventionally mineralized aluminas. The residual fluoride and soda can be substantially reduced with post mineralized treatments but not quite as well as the liquid load/leach examples described above. An Alcoa gibbsite (similar to that used in Example 2) with a soda content of 0.41 wt. % and a fluoride content of 0.012 wt. % was precalcined to 950° C. to remove water and stabilize the surface area at 50 M²/gram. This procedure was necessary because the actual mineralization was to be performed in a deep bed in a natural gas fired converter and the evolution of gibbsitic water would force the sample out of the crucible during the rapid heatup. 600.0 grains of the material was put into two crucibles with thermocouples inserted at the bottom. One of the crucibles (#2) was also fitted with a 99.8 wt. % alumina delivery tube at the bottom. The crucibles were placed in a natural gas fired converter and heated to 1025°–1050° C. (time over 1000° C.=40–45 minutes). Fluoroform was metered into the second crucible by a mass flow controller at a rate of 18.7 ml/min starting at 800° C. (20 minutes before the crucible hit 1000° C.). Crucible #1 alumina was found to be non-mineralized (still kappa phase transition alumina) with a surface area of 26 M²/gram. Crucible #2 alumina was found to be mineralized alpha phase with a surface area of 0.28 M²/gram. The mineralized alumina had a fluoride content of 0.62 wt. % indicating almost total retention of the loaded fluoride from the decomposed fluoroform. The soda content of the mineralized alumina was found to be 0.39 wt. %. A mineralized sample was leached with hot water and dried. The soda was reduced to 0.087 wt. % and the fluoride to 0.12 wt. %. A sample of mineralized alumina was also treated at 1050° C. for 60 minutes in an open crucible. The soda was reduced to 0.18 wt. % and the fluoride to 0.03 wt. % for the heat treated sample.

EXAMPLE 12

This example shows how soda can substantially be reduced with this procedure to make high purity alpha crystals. A experimental gibbsite sample (lab precipitated #2 in Table 1) was precipitated in the lab with a soda content of 0.45 wt. %. The sample was activated to 250 M²/gram to remove excess water. The cooled sample was leach loaded in a similar way to that detailed in Example 5. The dried leach/loaded alumina had a soda content of 0.09 wt. % and a fluoride content of 0.62 wt. % indicating more than 95% adsorption of fluoride from solution. The leach/loaded alumina was mineralized in a 99.8 wt. % alumina crucible for 60 minutes at 1000° C. The cooled alumina was found to be 99+% alpha alumina with a soda content of 0.006 wt. % and a fluoride content of 0.02 wt. %. The mineralized sample was leached with hot water and dried. The dried leached sample was found to have a soda content of 0.002 wt. % and a fluoride content of 0.01 wt. %. This represents a 99.6% reduction in soda level from the initial gibbsite.

EXAMPLE 13

An activated alumina powder (Alcoa CP-100) was leach loaded in a manner similar to the examples described above. The soda level of the activated alumina was 0.35 wt. %. The powder had a surface area of 250 M²/gram and a average particle size d(50) of 92 microns. The dried leach/loaded alumina had a soda level of 0.14 wt. % and fluoride content of 0.35 wt. %. 620 grams of the leach loaded powder was mineralized at 1000° C. for 60 minutes in a 99.8 wt. % alumina crucible. The cooled mineralized alumina was found to be 99+% alpha alumina with a soda content of 0.14 wt. % and a fluoride content of 0.22 wt. %. A portion of the cooled mineralized alumina was leached with hot water and dried. The dried sample was found to have a soda content of 0.014 wt. % and a fluoride content of 0.05 wt. % which represents a 96% reduction in soda level from the starting CP-100. Another portion of the mineralized sample was returned to a 99.8 wt. % alumina crucible and treated at 1000° C. for 60 minutes. The soda content of the sample was found to be virtually unchanged at 0.13 wt. % while the fluoride level was reduced from 0.22 wt. % to 0.02 wt. % The vapor pressure of various fluoride compounds is listed in Table 3 at 1000° C. The table strongly suggests that a compound such as atmolite was the means of escape for the fluoride from the recalcined sample.

EXAMPLE 14

This example shows the influence of sodium on the low temperature mineralization. An Alcoa produced low soda gilbsite sold as C-35 alumina was used to demonstrate this phenomenon. The gibbsite had a soda level of 0.062 wt. %. ($SiO_2$=0.002 wt. %; CaO=0.02 wt. %; fluoride=0.002 wt. %). The C-35 alumina was activated and leach loaded in a similar fashion as described in Example 2. The leach/loaded alumina had a soda content of 0.02 wt. % and a fluoride content of 0.62 wt. %. Part of the leach/loaded alumina was separated and loaded with more sodium (incipient wetness impregnation used with sodium acetate) to bring the soda level to 0.90 wt. %. The samples were mineralized in separate 99.8 wt. % alumina crucibles at 1000° C. for 60 minutes. Both samples mineralized to 99+% alpha alumina. The undoped sample had less than 10 wt. % of its crystals larger than 4 microns, while the doped sample had more than 80 wt. % of its crystals larger than 6 microns. The example shows that sodium does play a important role in this low mineralization chemistry. The role may well be helping the mineralizer form more quickly allowing for larger crystals to grow. The sodium may also keep the mineralizer in place by reducing its vapor pressure.

Having described the presently preferred embodiments; it is to be understood that the invention may be otherwise embodied within the scope of the appended claims.

What is claimed is:

1. A process for making alpha alumina particles comprising:
   (a) treating particles of alumina having an LOI of less than about 20 wt. % with an aqueous solution containing a dissolved fluorine-containing compound and an acid;
   (b) separating the treated alumina particles from the solution; and
   (c) calcining the alumina particles at a temperature in the range of about 950°–1025° C. for a sufficient time to convert at least most of the alumina to alpha alumina; and
   (d) comminuting the calcined particles to an average particle size of less than about 10 microns.

2. The process of claim 1 wherein the alumina particles contain sodium oxide before step (a) and treating the particles with the solution loads fluoride ions onto the particles.

3. The process of claim 1 wherein the alumina particles comprise partially calcined alumina derived from a dust recovery system.

4. The process of claim 1 wherein said solution is an acidic solution having a pH of less than about 7 before step (a).

5. The process of claim 1 wherein said solution contains acetic acid.

6. The process of claim 1 wherein said solution contains a fluoride selected from the group consisting of ammonium bifluoride, KF, NaF and $NH_4F$.

7. The process of claim 1 wherein said solution contains ammonium bifluoride.

8. The process of claim 1 wherein step (c) comprises calcining said particles at about 975°–1025° C. for about one-half hour to two hours.

9. The process of claim 1 wherein step (c) comprises calcining said particles at about 1000° C. for at least one-half hour.

10. The process of claim 1 wherein the particles of alumina have an LOI in the range of about 2–12 wt. %.

11. The process of claim 4 wherein said particles contain sodium oxide before step (a) and treatment with the acidic solution leaches sodium oxide from said particles.

12. A process for making alpha alumina particles having an average size of less than about 10 microns comprising:
   (a) treating alumina particles having an LOI of about 1–20 wt. % with an aqueous acidic solution containing a dissolved fluoride;
   (b) separating the treated alumina particles from the solution;
   (c) calcining the treated alumina particles of step (b) at a temperature not greater than about 1025° C. for a sufficient time to convert at least most of the alumina to alpha alumina;
   (d) cooling the calcined alpha alumina particles; and
   (e) comminuting the calcined alpha alumina particles of step (d) to an average particle size of less than about 10 microns.

13. A process for making alpha alumina particles, comprising:
   (a) treating particles of alumina containing sodium oxide and having an LOI of less than about 20 wt. % with an aqueous solution containing a dissolved fluorine-containing compound and acetic acid, thereby to leach sodium oxide from said particles;
   (b) separating the treated alumina particles from the solution, said particles having reduced sodium oxide content; and
   (c) calcining the alumina particles at a temperature not greater than about 1025° C. for a sufficient time to convert at least some of the alumina to alpha alumina.

14. The process of claim 13, wherein said solution has a pH between 4.5 and 7.

15. The process of claim 13, wherein said solution has a pH between 5 and 6.5.

16. The process of claim 13, further comprising:
   (d) comminuting the alpha alumina particles of step (c).

* * * * *